United States Patent [19]

Honick

[11] 4,096,630
[45] Jun. 27, 1978

[54] POLE PRUNER

[76] Inventor: Cecil W. Honick, 4008 W. Ave. 43, Los Angeles, Calif. 90041

[21] Appl. No.: 782,640

[22] Filed: Mar. 30, 1977

[51] Int. Cl.² .............................................. B26B 13/00
[52] U.S. Cl. ................................... 30/258; 30/296 R; 30/272 R
[58] Field of Search ................ 30/182, 184, 249, 251, 30/258, 272 R, 296 R; 81/347

[56] References Cited

U.S. PATENT DOCUMENTS

| | | | |
|---|---|---|---|
| 1,125,057 | 1/1915 | Bull | 30/249 |
| 1,897,514 | 2/1933 | Hansen | 30/184 |
| 2,195,045 | 3/1940 | Bernay | 30/272 R |
| 2,285,780 | 6/1942 | Newman | 30/182 |
| 2,759,262 | 8/1956 | Belsky | 30/272 R |

Primary Examiner—Gary L. Smith
Assistant Examiner—James G. Smith
Attorney, Agent, or Firm—Lawrence Fleming

[57] ABSTRACT

An improved tree-pruning tool of the type known as a pole pruner, which features greatly reduced friction in operation. A cutting blade and an anvil are moved toward each other in a linear path. The blade is on top, so that the downward bending of the tree branch will tend to open the cut rather than to pinch the blade. Friction is further reduced by a novel cam-like engagement of the moving parts with a guide pin, which eliminates incidental lateral displacements of the cutting elements due to the geometry of the operating lever. The mechanism is simple, and may be made from stampings.

7 Claims, 7 Drawing Figures

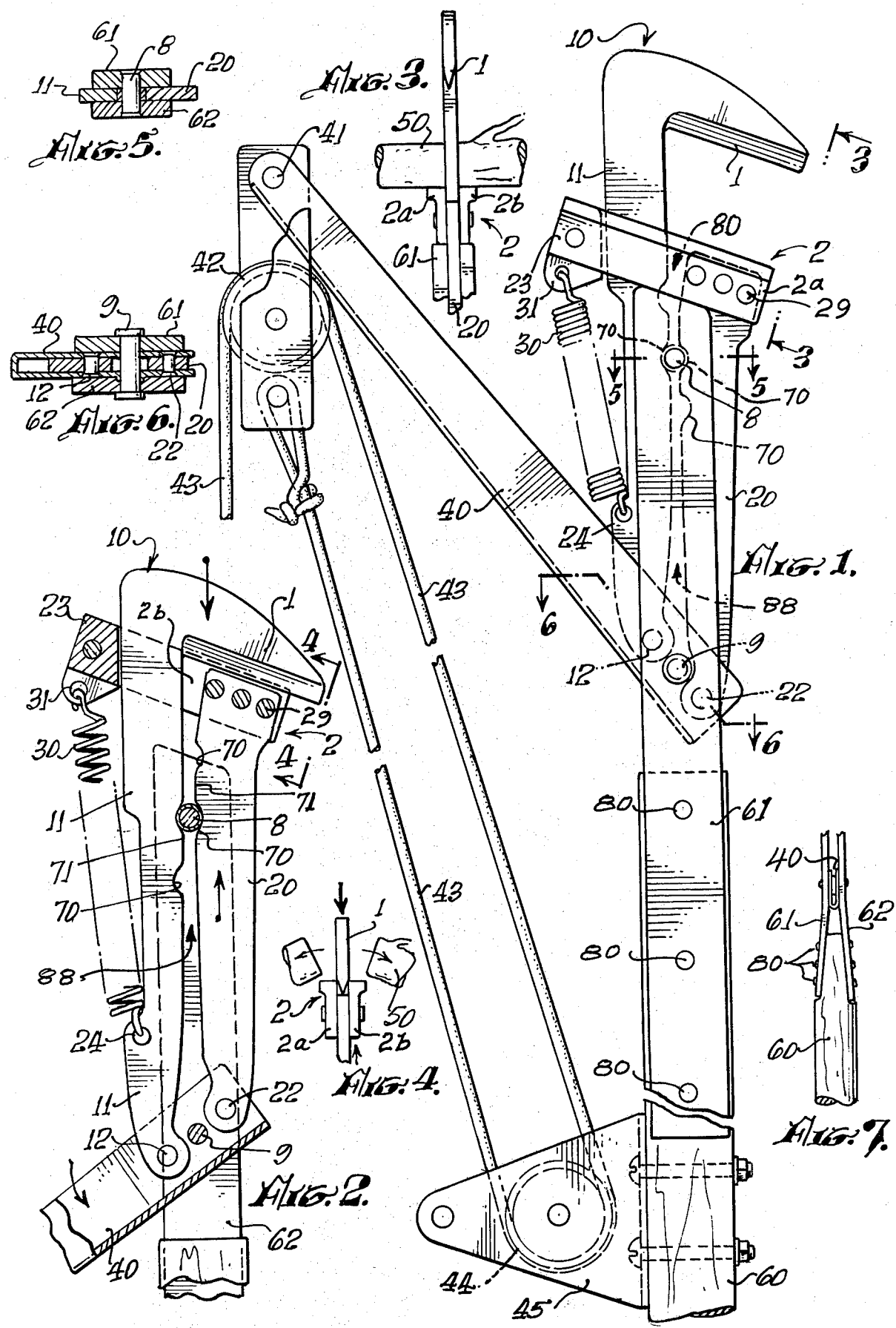

POLE PRUNER

BACKGROUND

Pole pruners are widely used by gardeners, arborists, and orchadists. Conventional tree-pruning tools of this type tend to be heavy and to require considerable manual energy to operate. A substantial portion of the energy is wasted in friction between the sides of the blade and the walls of the kerf or cut. In pruners of the type where the blade cuts from the side or bottom, it gets pinched as the weight of the branch tends to close the kerf, creating undue friction. In types where the blade moves laterally in addition to moving into the kerf, there is additional friction.

There appears a need for a pole pruner which is free of both pinching and lateral movement of the blade; such a pruner minimizes all friction not directly required for cutting, and so may be made lighter in weight as well as easier to use.

BRIEF SUMMARY

This pole pruner comprises a cutting assembly having an upper blade and a lower anvil which are moved toward each other in substantially a straight-line path. They are moved by a lever means of known type, which is pulled downward by a rope or cord in the known way. The cutting assembly is mounted on the end of a pole, in known manner.

Downward, generally vertically-depending stem-like portions of the blade and anvil elements are pivoted to the lever, which in turn is pivoted to a side-plate structure fastened to the pole. Both the blade and the anvil move with respect to the side-plates, the blade being on top.

The geometry of the pivoted members tends, by itself, to impart a significant rocking or sawing displacement to the blade and anvil, in addition to the desired motion. This undesirable friction-producing displacement is eliminated in this invention by the provision of novel cam-like contours on the inner profiles of the stem-like portions of the blade and anvil elements, working in cooperation with a guide pin.

The direct forces of cutting are borne entirely by the pivot pins. All other surfaces which operate in sliding engagement serve only to guide the cutting elements. The working parts may be made of metal stampings.

DETAILED DESCRIPTION

In the drawing:

FIG. 1 is a side view of the mechanism of a pole pruner according to the invention;

FIG. 2 is a side interior view of the same mechanism with one side-plate removed;

FIG. 3 is an end view of the blade and anvil from direction 3—3 of FIG. 1;

FIG. 4 is an end view like FIG. 3, but with the blade down, looking in direction 4—4 of FIG. 2;

FIG. 5 is a section on line 5—5 of FIG. 1;

FIG. 6 is a section on line 6—6 of FIG. 1; and

FIG. 7 is a partial front view showing the side-plates.

Referring first to FIGS. 1, 2, and 3, the cutting agents of the pruner are a blade edge 1 and an anvil 2. They are normally open or apart. The blade 1 is hooked over a tree branch, and the generally-horizontal blade and anvil are drawn together by pulling on a rope or cord 43 which operates a lever 40.

The whole blade element is indicated generally at 10. Besides its cutting edge portion 1, it has a generally-vertically-depending stem portion 11 which extends downward to engage a pin 12 which connects it to the lever 40. The blade element 10 may preferably be made of a single flat steel stamping about 3 mm thick.

The anvil element, indicated generally at 2, comprises a pair of side bars 2a, 2b (FIG. 3), a generally-vertically-depending stem 20, and a back filler piece 23 (FIGS. 1 and 2). The side bars 2a, 2b support the lower surface of a tree branch 50 (FIG. 3); and after the cut is complete, the blade edge 1 may pass a short way between them, FIG. 4.

The blade stem portion 11 is connected pivotally to the lever 40 at 12, FIGS. 1 and 2, as noted above. Similarly, the stem portion 20 of the anvil element 2 is pivoted to the lever at 22. The lever 40 itself is pivoted to the side-plates 61, 62 by pin 9. The side-plates in turn are fastened to the top of the pole 60, FIG. 7. Thus, when the lever 40 is pulled down, it pulls the blade 10 downward and pushes the anvil 2 upward. FIG. 1 shows the blade and anvil in open position, and FIG. 2 shows them closed.

The side-plates 61, 62 support and guide the blade-anvil subassembly solely by means of two pins 8, 9. Pivot pin 9 was described above. The other pin is the guide pin 8, FIGS. 1 and 2, which engages the cam-like inner edge surfaces of blade stem 11 and anvil stem 20 as at 70, 71. This is described later.

The subassembly of blade 1 and anvil 2 is maintained in a mutually-guided relation by the slidable engagement of the blade stem 11 in between the side bars 2a, 2b. These side bars, FIG. 3, are held spaced apart by the upper end portion of the anvil stem 20 and the back filler piece 23. These may all be riveted together as indicated in FIGS. 1 and 2, as by rivets 29. The space 80 (FIG. 1) left between the foregoing elements in box-like in shape, and the blade stem 11 passes down through it.

It will be seen in FIGS. 1 and 2 that a rather wide space 88 remains between the inner edge portions of blade stem 11 and anvil stem 20; these edge portions are held apart and guided by the guide pin 8. This guide pin 8 is fastened between the side-plates 61, 62 in the same manner as pivot pin 9. It is also apparent that the inner edge profile portions of the stems 11 and 20 are provided with cam-like contours 70, 71, shown best in FIG. 2. The purpose of these contours is to compensate or correct for relative lateral or rocking displacements of the blade and anvil as the lever causes them to move in opposite directions. This compensation is desirable to minimize the friction incident to cutting a twig or branch.

The compensation works as follows. It is apparent that the horizontal distance between the pivot pin 12 and 22 will vary as the cosine of the angle of the lever 40 from the horizontal. If, as is typical, the centers of pins 12 and 22 are about 25 cm apart, they will be horizontally but about 18 cm apart when the lever is at a 45° angle up or down (as it is in FIGS. 1–2). Thus, as the lever is moved, the ends of the stems 12 and 22 move apart and together like scissors; without compensation, this would produce a rocking and sawing type of relative displacement of the blade 1 and anvil 2. Such movements would add to the friction, but would not help to cut.

Each of the cam-like profile contours comprises two curved indentations 70, with raised spaces in between as at 71, FIGS. 1 and 2. When the lever 40 is all the way up, FIG. 1, a pair of these indentations 70 fall opposite each other on each side of the guide pin 8: this permits the blade and anvil stems 11, 20 to lie closer together than if the indentations were absent, and compensates for the fact that the stem ends at pivot points 12 and 22 are closer together in a horizontal direction. The same compensation occurs when the lever 40 is all the way down; here, FIG. 2, another pair of indentations 70 fall opposite each other around the guide pin 8. In between, when the lever is horizontal (not shown), it will be evident that two raised or non-indented portions 71 will fall opposite the guide pin 8, holding the stems somewhat farther apart. Since the stem ends at 12, 22 are also farther apart, it will be seen that the cam-like surfaces 70, 71 and the guide pin 8 operate to keep the relative displacements of blade and anvil linear and parallel. This feature does not add appreciably to the cost of manufacture.

Because of the location of pivot 9 in between the stem pivot pins 12 and 22, the effective leverage is greater than if the pivot 9 were at one end.

The lever 40 may preferably be actuated in the known way for pole pruners by means of a light rope or cord 43, FIG. 1, a pulley 44 in a bracket 45 fastened to the top portion of pole 60, and another pulley 42 on the end of the lever 40, as shown in FIG. 2. The overall mechanical advantage may typically be about 30:1, i.e., about 1 meter of pull on the rope or cord 43 to produce about 3.3 cm of closure of the blade and anvil into the tree branch being cut off. The pole 60 may be made of wood or of metal tubing about 2 or 3 meters long, in known manner. It may be fastened to side-plates 61, 62 by means of rivets 80, FIGS. 1 and 7. Lever 40 may preferably be formed of sheet metal in a narrow U-shaped cross-section, as shown in FIGS. 2, 6, and 7. The pivot ends of stem portions 11, 20 may lie between the legs of the U, as shown.

The return spring, FIGS. 1 and 2, is preferably a coil tension spring 30 connected between a suitable portion of the blade stem 11 at a suitable lower point with a hole 24, and a protrusion of the anvil back filler piece 23 having a suitable hole at 31. The spring 30 will obviously operate to pull the blade 1 and the anvil 2 together, absent any pull on the cord or rope 43.

The blade edge portion 1 is preferably made longer than the anvil 2 so that it protrudes like a hook, FIGS. 1 and 2, and may be hooked over a tree branch overhead by the operator preparatory to pruning.

The blade element 10, the components 2a, 2b, 23, and 20 of the anvil element 2, and the side-plates 61, 62, may all be made of metal stampings. The side-plates are preferably made from an aluminum alloy to reduce weight.

I claim:

1. A pole pruner comprising:
   a pole;
   a blade element having a generally-horizontal cutting edge portion facing downward and a generally vertically-depending stem portion;
   an anvil element having two spaced generally-horizontal side bar portions facing said cutting edge portion and a generally vertically-depending anvil stem portion fastened thereto;
   an actuating lever;
   a side-plate and means fastening said side-plate to said pole;
   pivot pins connecting each said stem portion to said lever at stem pivot points;
   a lever pivot pin connecting said lever to said side plate at a point between said stem pivot points,
   said lever thereby moving said stem portions in opposite directions,
   said anvil element side bar portions and said anvil stem portions being fastened together with an anvil back filler piece to form an open box-like structure,
   said blade stem portion being slidably enclosed in said structure, and said pivot pins, guide pin, and back filler piece forming the sole means to guide said blade and anvil in parallel relation; and further comprising:
   a first pulley on a bracket at the outer portion of said lever,
   a second pulley fastened to said pole, and
   a flexible actuating cord extending from said bracket around said second pulley, then around said first pulley, and extendable downward therefrom.

2. A pole pruner as in claim 1, further comprising:
   a guide pin fastened to said side-plate at a point above said lever pivot pin and extending between inner edge portions of said stem portions, and
   cam-like contours on the inner profiles of said inner edge portions, each engaging said guide pin to maintain the said stem portions substantially parallel as the angle of said actuating lever is varied.

3. A pole pruner as in claim 2, wherein:
   said cam-like contours each comprise two indentations with a raised portion therebetween,
   two opposing said indentations lying opposite and partly embracing said guide pin at one extreme position of said lever,
   another two opposing said indentations lying opposite and partly embracing said guide pin at the other extreme position of said lever, and
   said raised portions lying opposite said guide pin at an intermediate position of said lever.

4. A pole pruner as in claim 1, further comprising:
   a spring-engaging portion on said back filler piece,
   another spring-engaging portion on said blade stem portion, and
   a tension spring engaged therebetween to urge said blade and anvil elements together toward a closed position.

5. A pole pruner as in claim 4, wherein:
   said cutting edge portion extends horizontally outward beyond said side bar portions, to hook over a tree branch.

6. A pole pruner as in claim 1, wherein:
   said lever is formed of sheet metal in a narrow U-shaped cross-section,
   said section extending between said side-plates, and
   the pivot ends of said stem portions lying inside said section.

7. A pole pruner comprising:
   a pole;
   a blade element having a generally-horizontal cutting edge portion facing downward and a generally vertically-depending blade stem portion;
   an anvil element having two spaced generally-horizontal side bar portions facing said cutting edge portion and a generally vertically-depending anvil stem portion fastened thereto;
   an actuating lever;
   a side-plate and means fastening said side-plate to said pole;
   pivot pins connecting each said stem portion to said lever at stem pivot points;

a lever pivot pin connecting said lever to said side plate at a point between said stem pivot points, said lever thereby moving said stem portions in opposite directions, said anvil element side bar portions and said anvil stem portions being fastened together with an anvil back filler piece to form an open box-like structure, said blade stem portions being slidably enclosed in said structure, and said pivot pins, guide pin, and back filler piece forming the sole means to guide said blade and anvil in parallel relation; and further comprising:

cable-like actuating means attached to said lever and extendable generally downward along said pole and disposed when pulled in tension to draw said lever downward to cause said blade and anvil to move toward each other.

* * * * *